W. WEAVER.
HAY BUNCHER FOR ATTACHMENT TO HORSE RAKES.
APPLICATION FILED OCT. 24, 1911.

1,055,580.

Patented Mar. 11, 1913.

2 SHEETS—SHEET 1.

WITNESSES
/s/ Brown
R. T. Chase

INVENTOR
William Weaver
By F. B. Scott
ATTORNEY.

W. WEAVER.
HAY BUNCHER FOR ATTACHMENT TO HORSE RAKES.
APPLICATION FILED OCT. 24, 1911.
1,055,580.
Patented Mar. 11, 1913.
2 SHEETS—SHEET 2.
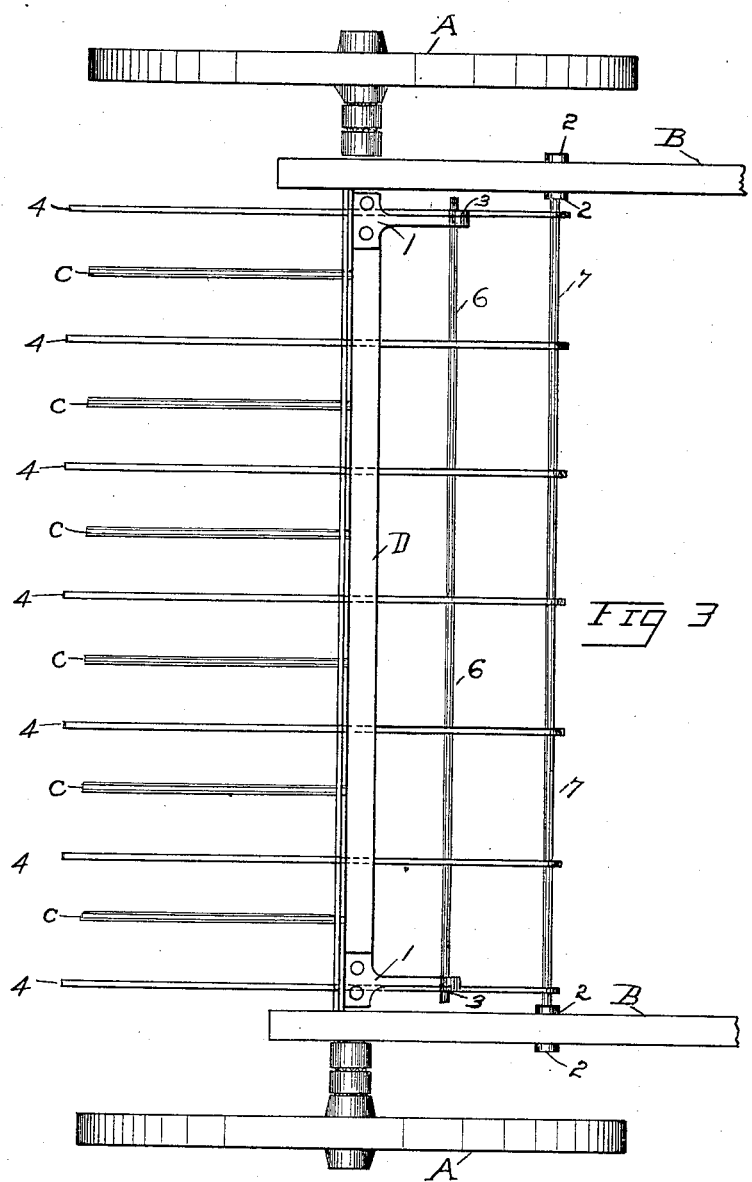

UNITED STATES PATENT OFFICE.

WILLIAM WEAVER, OF SALT LAKE CITY, UTAH.

HAY-BUNCHER FOR ATTACHMENT TO HORSE-RAKES.

1,055,580.  Specification of Letters Patent.  Patented Mar. 11, 1913.

Application filed October 24, 1911. Serial No. 656,519.

*To all whom it may concern:*

Be it known that I, WILLIAM WEAVER, a citizen of the United States, residing at 2090 Major avenue, in the city and county of Salt Lake and State of Utah, have invented certain new and useful Improvements in Hay-Bunchers for Attachment to Horse-Rakes, of which the following is a specification.

It has for its object the providing of an attachment for a hay rake which, when the rake is raised for dumping, will go downward as the rake teeth are lifted and thus compress and bunch the hay.

Other objects and advantages will be apparent from the following description, and it will be understood that changes in the specific structure shown and described may be made within the scope of the claims without departing from the spirit of the invention.

Figure 1:
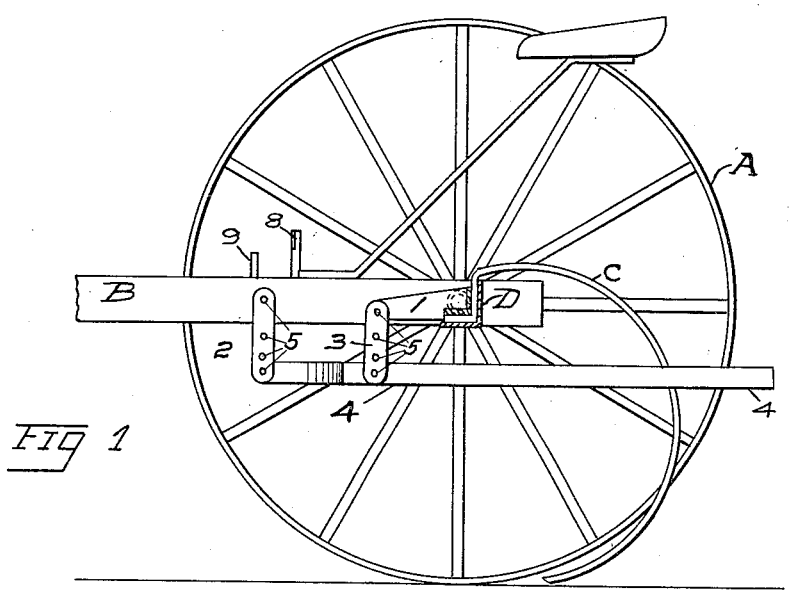
Figure 2:
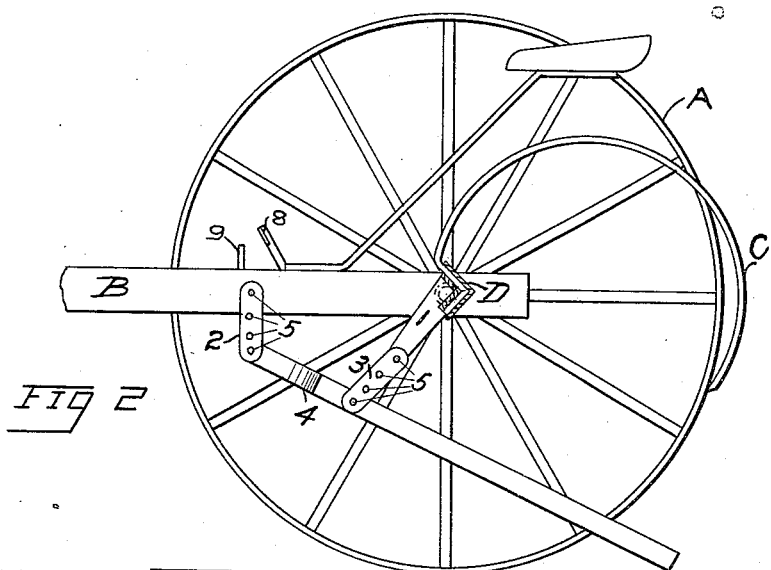

In the drawings: Figure 1 is a side elevation showing the buncher and rake teeth in normal position. Fig. 2 is a side elevation showing the rake and attachment in position at the instant the hay has been dropped and bunched. Fig. 3 is a top plan view of my rake cleaning mechanism.

My attachment may be placed on a horse rake of any approved type, the mechanism of such horse rake being no part of my invention is not particularly shown and described.

In the drawings: A represents the wheel of the horse rake, B represents portions of the shafts, C represents a tooth of the hay rake, D represents the angle-iron axle.

1 is a lever attached to the forward part of the axle pivoted in the forward end to another hanger 3, which in turn is adjustably pivoted to the rod 4 by means of the rod 6 passing through one of the several holes 5 in the hanger 3.

2 is a hanger immovably attached by a bolt through the upper hole 5 to the frame B and at the other end adjustably pivoted to the rod 4 by the rod 7 passing through one of the holes 5. 8 and 9 are the levers of an ordinary horse-rake; their connection and operation with the axle D not being a part of this invention is not described.

My hay bunching mechanism consists of a plurality of parallel horizontal cleaning fingers or rods 4 which pass between the rake teeth C at suitable intervals and extend rearwardly of the rake teeth a distance sufficient to allow the latter in their upward sweep, and the downward sweep of the cleaning rods, to remain entirely forward of the extremities of the cleaning fingers. The cleaning fingers are kept in parallel spaced relation by the cross rod 7.

In the operation of the mechanism, when a rake full of hay is gathered and it is desired to dump it the lever 8 is depressed by the operator as in the ordinary horse rake; this rotates the axle in a forward direction, raising the rake teeth C, at the same time the rotation of the axle moving forward and downward carries with it the levers 1 which are pivoted to the hangers 3 and they in turn to the cleaning rods 4; the other end of the cleaning rods 4 being pivoted to the hangers 2, the cleaning rods are carried downward; thus with the double motion of the rake teeth upward and the cleaning rods downward the hay is effectually removed from the teeth and by the pressure of the cleaning rods 4 bunched and left on the ground.

This attachment may be mounted on any style of horse rake and may be cheaply and easily manufactured and will be efficient in operation.

It will be noticed that the hangers 5 and also the hangers 3 have several holes. When desired these levers and hangers may be vertically adjusted in connection with the cleaning rods 4 so as to dispose the cleaning rods 4 at various heights with respect to the tangs of the rake, in order to make the device adjustable to use with various qualities of hay.

What is claimed is:

1. In combination a horse rake comprising ground wheels, an axle supported by said ground wheels, a frame supported by said axle, a seat supported on said frame, a plurality of curved teeth rotatably mounted on said axle, a second frame arranged below the first mentioned frame; said second frame comprising a plurality of parallel horizontal cleaning fingers extending between the teeth of the rake, a plurality of hangers adjustably supporting one end of the said second frame; said hangers being adjustably connected to said first mentioned frame and in front of the said axle, a plurality of members rigidly attached to the front of the said axle at one end, and a plurality of adjustable hangers pivoted at one end to the said cleaning fingers, and at the other end pivoted to the said members attached to the front of the axle.

2. A hay-bunching attachment for horse-rakes comprising ground wheels, an angle shaped axle supported by said ground wheels, a frame supported by said axle, a seat supported on said frame, a plurality of curved teeth rotatably mounted on said axle, a second frame comprising a plurality of parallel horizontal cleaning fingers extending between the teeth of the rake, a pair of transversely arranged bars connecting said fingers, a plurality of hangers to which is adjustably pivoted the forward end of said second frame; a plurality of members rigidly attached to the forward part of said axle, a plurality of hangers adjustably pivoted to said members said second frame being also adjustably pivoted rearwardly to the last mentioned plurality of hangers.

3. In combination with a horse rake having ground wheels, an axle supported by said ground wheels, a frame supported by said axle, a seat supported by said frame, a plurality of curved teeth rotatably mounted on said axle, a hay-bunching attachment comprising a frame comprising a plurality of parallel, horizontal, cleaning fingers, extending between the teeth of the rake, a pair of transversely arranged bars connecting said fingers, a plurality of hangers pivoted to the forward end of said cleaning fingers, said hangers being adjustably pivoted to the said first mentioned frame, a plurality of levers rigidly attached to the forward part of said axle, a second plurality of hangers having one end adjustably pivoted to said plurality of levers and their other end adjustably pivoted toward the middle of the said cleaning fingers, said cleaning fingers being moved downward by the forward rotation of the said axle simultaneously with the rake teeth being lifted upward by the same operation.

In testimony whereof I have hereunto set my hand in the presence of two witnesses.

WILLIAM WEAVER.

Witnesses:
C. E. BROWN,
R. MORRIN.

---

Copies of this patent may be obtained for five cents each, by addressing the "Commissioner of Patents, Washington, D. C."